United States Patent [19]

Campbell

[11] Patent Number: 5,660,405
[45] Date of Patent: Aug. 26, 1997

[54] STABILIZED HANGING STEP PLATFORM

[76] Inventor: Darwin Campbell, 11208 - 29th Ave. SW., Seattle, Wash. 98146

[21] Appl. No.: 539,275

[22] Filed: Oct. 4, 1995

[51] Int. Cl.$^6$ ................................................. B60R 3/02
[52] U.S. Cl. ........................ 280/166; 182/88; 182/91
[58] Field of Search ........................ 280/164.1, 163, 280/166, 765.1, 764.1; 182/91, 88; 105/143, 147, 149

[56] References Cited

U.S. PATENT DOCUMENTS

| | | | |
|---|---|---|---|
| 2,125,085 | 7/1938 | Pool | 280/166 |
| 3,008,533 | 11/1961 | Haberle | 182/88 |
| 3,162,867 | 12/1964 | Hoffman | 182/91 |
| 3,489,428 | 1/1970 | Hunter et al. | 280/765.1 |
| 3,493,077 | 2/1970 | Doten | 182/88 |
| 3,645,557 | 2/1972 | Aldropp et al. | 280/166 |
| 3,807,758 | 4/1974 | Rogge | 280/166 |
| 4,757,876 | 7/1988 | Peacock | 280/166 |

*Primary Examiner*—Brian L. Johnson
*Assistant Examiner*—Bridget Avery
*Attorney, Agent, or Firm*—David L. Tingey

[57] ABSTRACT

A retractable hanging step platform with stabilizers improves the stability of hanging steps found on motor homes and travel trailers. One or more support stabilizers are pivotably mounted on the underside of a step to engage the ground when the retractable hanging step platform is extended for use and to pivot alongside the step when retracted for storage during travel. The legs are also vertically adjustable to accommodate varying height conditions between ground level and the hanging step platform.

4 Claims, 3 Drawing Sheets

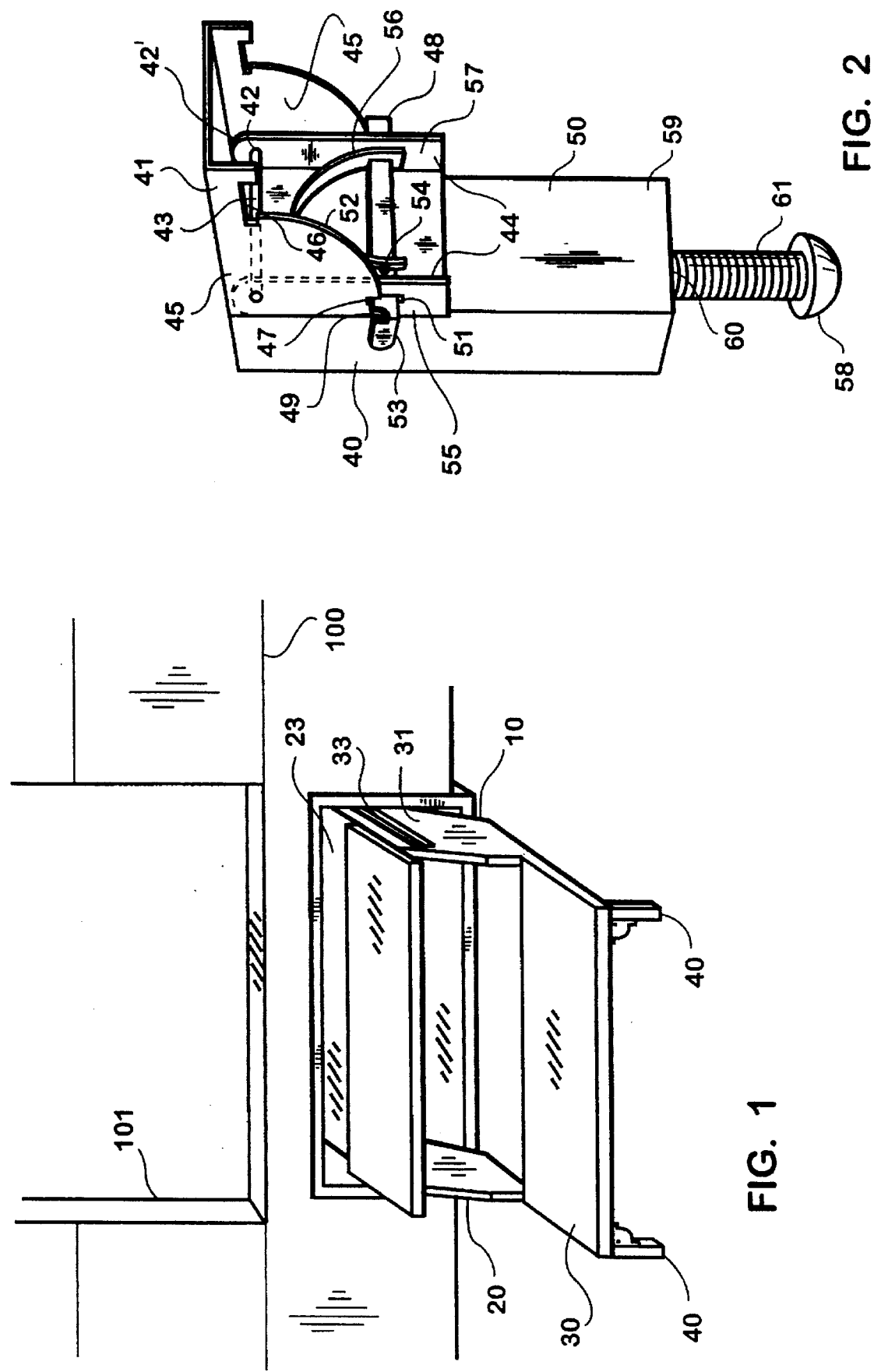

5,660,405

STABILIZED HANGING STEP PLATFORM

BACKGROUND OF THE INVENTION

1. Field of the Invention

The present invention relates to hanging steps useful for access to motor homes and trailers, and more specifically, to a fold-away hanging step platform having a ground-engaging stabilizer.

2. Prior Art

Because it is common in a motor home or a travel trailer to have its entry door higher than a comfortable step for a person, a hanging step is typically hung from the motor home frame under the door. The hanging step characteristically is raised and folded under and up against the motor home frame during travel. When the motor home is parked, the hanging step is unfolded down and away from the frame, thereby providing at least one intermediate step between ground and the motor home entry.

Hanging steps of the type used on trailers or motor homes have always presented problems for users. One problem is that the steps move when supporting the weight of a person. The steps may move because the whole trailer or motor home rocks under the weight of the person standing on it. Not only can this step movement be dangerous to those using the steps, but the movement is annoying to those sitting inside the trailer or motor home.

Another problem with hanging steps is their proclivity to break with use. With the step mechanically mounted to hang from the motor home (or trailer) frame, the mount mechanism must repeatedly sustain an entire load placed on the hanging step. Hence, it is not unusual for the step to disengage from motor the home frame under strain of repeated loads or excessive loads, either destructively perhaps be shearing of the step from the frame or loosening of mounting bolts. Compounding the strain is a tendency of users to stand on the step near an end or corner, in so doing exaggerating the strain on that end of the mount mechanism. The possibility of injury to a user when the step breaks heightens the need for a more suitable solution.

It is known to have various solutions to the need for a safe and convenient entrance step to motor homes, mobile homes, and travel trailers, including step portable porches and stools. While valuable in providing a safe entry step, such portable steps are at the expense of the convenience of having a step always at the point of use readily available simply by unfolding it from its stored position under the motor home or the like and easily and quickly stored simply by returning it folded to its store position under the motor home in facile preparation for travel.

It is unknown to have a step with the convenience of hanging from a motor home, storable unobstructively in a prescribed location under the motor home entry door, and, because it is mounted to the motor home, always available quickly and easily with a simple fold-down mechanism while yet providing a stable and safe support suitable in accommodating repeated and excessive loads placed on the step.

SUMMARY OF THE INVENTION

The principle object of this invention is to present a safe and convenient step access to motor homes, travel trailers and the like. It is another object to prevent hanging steps from premature breaking or generally separating from the motor home.

These objectives are obtained in a foldable step platform permanently mounted to a motor home, travel trailer, or the like, retractable and storable beneath a motor home entry door in folded configuration under the motor home, the step further having at least one retractable stabilizer extending from the hanging step platform to engagement with the ground. To accommodate variations in terrain, the stabilizers are adjustable in length. Typically, the stabilizers are retractably mounted to a bottom step of the hanging step platform.

BRIEF DESCRIPTION OF THE DRAWINGS

The best mode of carrying out the invention is illustrated in the accompanying drawings:

FIG. 1 is a perspective view showing a stabilized hanging step platform.

FIG. 2 is a perspective view of a hanging step platform retractable stabilizer in extended position.

DETAILED DESCRIPTION OF THE PREFERRED EMBODIMENT

Figure 3:
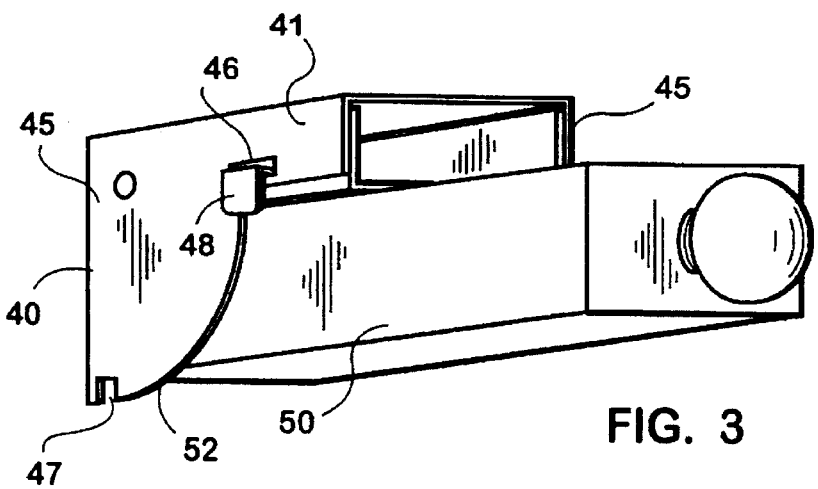
FIG. 3 is a perspective view of a hanging step platform retractable stabilizer in retracted position.
Figure 4:
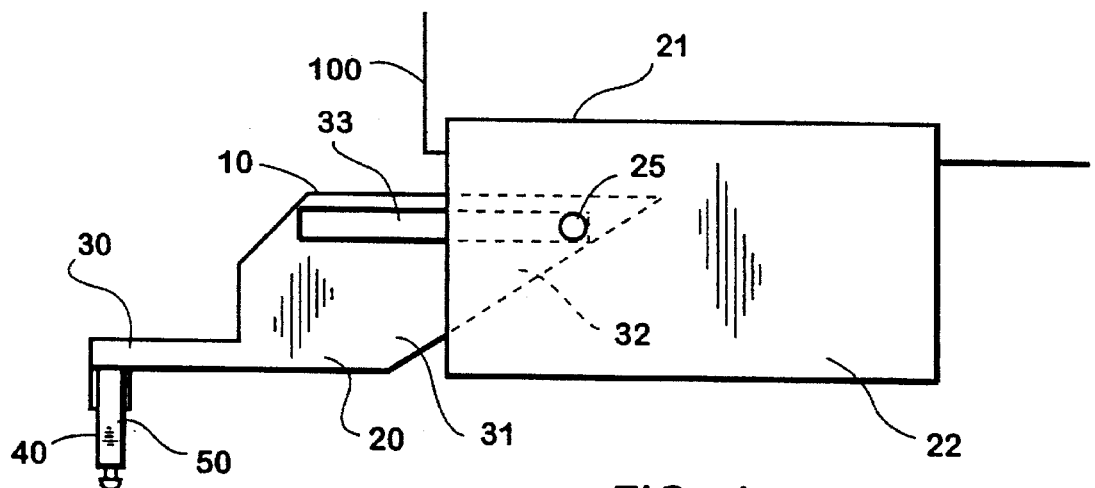
FIG. 4 is a side view of the hanging step platform shown with a step hanging from a motor home.
Figure 5:
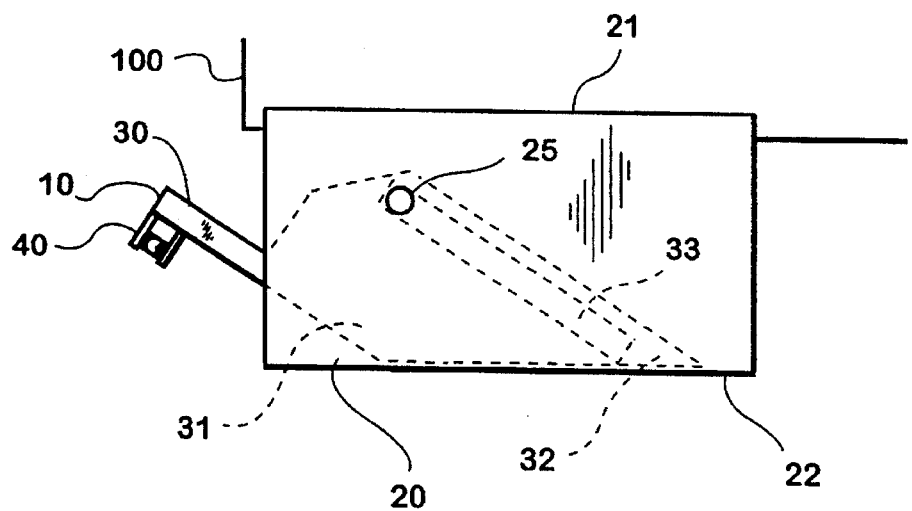
FIG. 5 is a side view of the hanging step platform shown retracted under a motor home.
Figure 6:
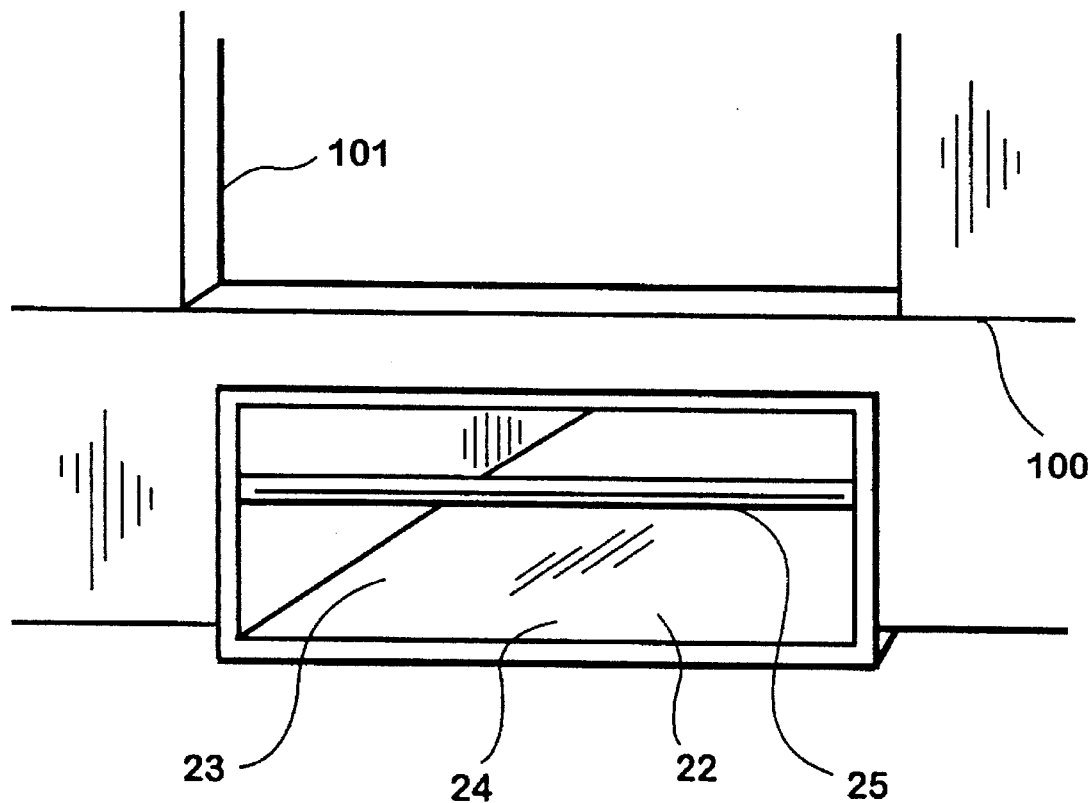
FIG. 6 is a perspective view of the hanging step platform mounting chute without a hanging step.
Figure 7:
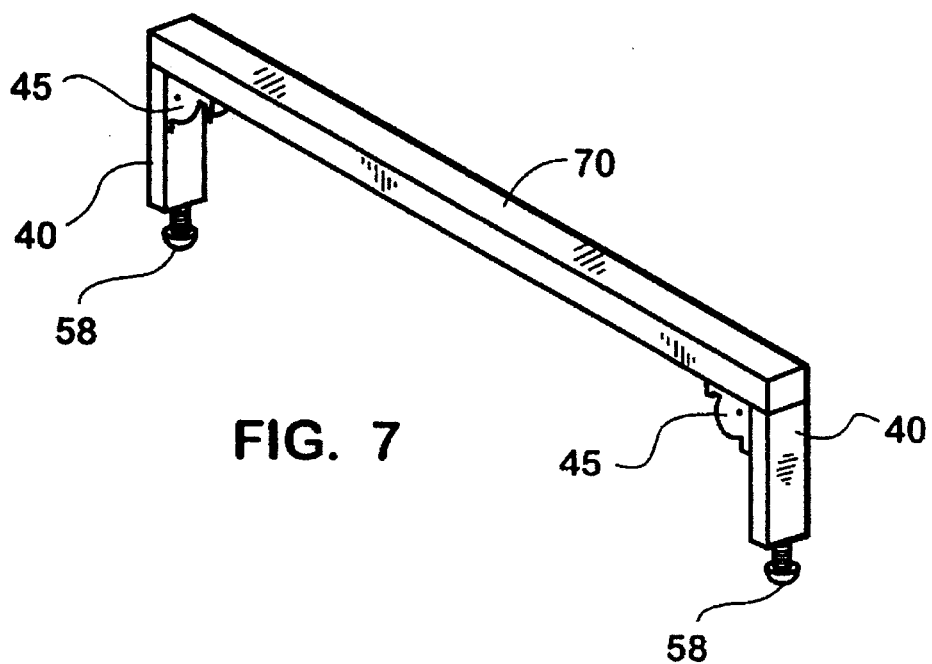
FIG. 7 is a perspective view of a stabilizer secured to each end of a horizontal mount.

Referring to the figures, the present invention comprises a hanging step platform 10 for mounting permanently to a motor home 100, travel trailer, or the like, under an entry door 101 disposed to hang from the motor home 100 before its door 101 as an auxiliary step for ease in entering the motor home 100. The hanging step platform 10, adapted to retract for storage under the motor home 100, comprises two matching spaced-apart support braces 20 with mounting means for securing the braces 20 to the motor home 100. The mounting means may comprise a top plate 21 with holes (not shown). Nuts and bolts (also not shown) are then inserted through the holes and aligned holes in the motor home 100 to tighten the support braces 20 securely to the motor home 100. Similarly, the mounting member may be welded to the motor home 100.

The mounting means also comprises a bottom plate 22 also between the braces 20 that, together with the support braces 20 and top plate 21 form a chute 23 open at a front 24 directed outward from under the motor home 100. A support bar 25 above the bottom plate 22 is secured near the chute front. A bottom step 30 adapted to fit in the chute 23 for storage slides out of the chute front 24 for use as a step. The bottom step 30 is supported between two step side plates 31 that extend upward and rearward from the bottom step 30 and pivotably hang from the support bar 25. Each step side plate 31 forms a triangular end 32 extending upward and rearward of the bottom step 30 and has a slot 33 running into the triangular end 32 with the support bar 25 passing through the slot 33. Thus, when the step 30 is slid rearward in the chute 23 the support bar 25 is forward in the side plate slots 33 with the step 30 tipped upward and resting on the triangular end 32. When the step 30 is pulled out of the chute 23, the step support bar 25 is fully rearward in the slots 33 supporting the step hanging from the bar with the triangular end resting on the bottom plate at the chute front.

For added stability, the hanging step platform 10 further includes a retractable stabilizer 40 which comprises a stabilizer bracket 41 secured central to and under a platform step, such as the bottom step 30; a stanchion 50 with locking means; and with a pivot member 42 having a hole 42 through which a pivot pin 43 passes. In fact, the pivot member may comprise one or more arms 44 extending from the stanchion 50 each with holes through which the pivot pin 43 passes, thereby pivotably securing the stanchion 50 to the stabilizer bracket 41. The stabilizer bracket 41 further includes two side members 45 spaced apart by the pivot pin 43 which is secured thereto, each side member 45 having a retracted position locking notch 46 and an extended position locking notch 47.

The stanchion locking means includes a locking bar 48 with a notch 49 on each end and a first and a second bar support 55 and 57 mounted to the stanchion 50 and disposed between and proximate the bracket side members 45, respectively. Each bar support 55, 57 has a slot 51 through which the locking bar 48 passes such that the bracket side members 45 slidably fit into the locking bar notches 46 and 47, respectively. The bracket side members 45 further comprise a radial arc trackway 52 drawn from the pivot pin 43 such that the stanchion 50 and bar supports 55, 57 pivot on the pivot pin 43, they pass between the bracket side members 45 with the trackways 52 of the bracket side members 45 passing through the locking bar notches 46 and 47. The locking means further includes a bend 53 at one end of the locking bar 48 and a stop 54 on the locking bar 48 between the bar supports 55, 57 which limits travel of the locking bar in a first bar support 55 between the bend 53 and the stop 54. A spring 56 is also provided on the locking bar 48 between the stop 54 and a second bar support 57 thereby biasing the locking bar stop 54 against the first bar support 55 therein causing the locking bar notches 46 and 47 to misalign with the side members 45, the locking bar 48 urged into them instead preventing the locking bar 48 and stanchion 50 from pivoting on the trackways 52 about the pivot pin 43. However, when the locking bar 48 is urged against the spring bias into alignment with the side members 45 and the locking bar notches 46, 47, the stanchion 50, locking bar 48 and bar supports 55 and 57 are free to rotate on the pivot pin 43.

In use then, the first side member retracted position locking notch 46 locates and releasably locks the stanchion 50 in a retracted position alongside the bottom step 30, and the extended position locking notch 47 locates and releasably locks the stanchion 50 in an extended position normal to the step for engagement with the ground surface.

To accommodate variations in terrain below the hanging step platform 10, the stanchion 50 includes an stanchion extension 58 extending from its distal end 59 in adjustment of the stanchion length. To secure the extension 58 at a desired extended length, the stanchion 50 has a threaded hole 60, and the extension 59 includes a matching threaded rod 61. The extension 59 is then screwed into the stanchion 50 through its threaded hole 60 until the desired extension length from the stanchion 50 is obtained.

For further stability, the hanging step platform 10 also comprises additional stabilizers 40 retractably mounted to the platform 10, preferably underneath the bottom step 30, with a least one stabilizer 40 at each step end. The stabilizers 40 may be secured to the step 30 directly or to an intermediary horizontal mount 70 which is itself then mounted to the step 30. A stabilizer 40 may then be mounted to each end of the horizontal mount 70.

One skilled in the art will recognize the advantages taught by this invention and illustrated by the preferred embodiment presented. The specification and drawings are not intended to represent an exhaustive description of the invention. Obvious applications and extensions of the invention are intended to be within the spirit and scope of this invention.

What is claimed is:

1. A retractable hanging step platform mounted on one of motor homes and travel trailers under an entry door and disposed to hang from the motor home before said door toward a ground surface on which the trailer is parked as an auxiliary step for ease in entering the motor home, adapted to retract for storage under the motor home during travel, including support side braces with mounting means for retractably securing the side braces to the motor home and supporting one or more steps secured between said side braces, including a bottom step having opposite ends, the improvement comprising a step platform stabilizer secured to a step for engaging the ground surface below the step platform, means for securing the stabilizer to the step platform, means for retracting the stabilizer comprising a stabilizer bracket secured to the step platform, a stanchion with ends, means for pivotably securing one end of the stanchion to the stabilizer bracket, comprising a pivot pin, a pivot member in the stanchion having a hole through which the pivot pin passes, and the stabilizer bracket including two side members spaced apart by the pivot pin which is secured thereto, means for locking the stanchion selectively normal to the bottom step in an extended position, or alongside the bottom step in a retracted position, comprising a locking bar with a notch on each end matching the bracket side members, respectively such that the stanchion and locking bar are free to rotate on the pivot pin with a bracket side member in each bar notch, a first and a second bar support mounted to the stanchion and disposed between and proximate the bracket side members, respectively, each bar support having a slot through which the locking bar passes such that the bracket side members slidably fit into the looking bar notches, respectively, the bracket side members further forming a trackway on a radial arc drawn from the pivot pin such that the stanchion and bar supports pivot on the pivot pin, passing between the bracket side members with the trackways of the bracket side members passing through the locking bar notches when the locking bar notches are in alignment with the bracket side members, the locking bar having a bend at one end and a stop intermediate the bar between the bar supports for limiting travel of the locking bar in the first bar support between the bend and the stop, and a spring on the locking bar between the stop and the second bar support biasing the locking bar stop against the first bar support causing the locking bar notches to misalign with the side members such that the locking bar is urged into said notches instead, thereby preventing the looking bar and stanchion from pivoting on the trackways about the pivot pin until the locking bar notches are urged against the spring bias into alignment with the bracket side members.

2. A retractable hanging step platform mounted on one of motor homes and travel trailers under an entry door and disposed to hang from the motor home before said door as an auxiliary step for ease in entering the motor home, adapted to retract for storage under the motor home during travel, including two matching support braces with mounting means for securing the braces to the motor home and spaced apart and a step, having opposite ends, secured between said side braces, the improvement comprising

- a step platform stabilizer for engaging the ground surface below the step platform,
- means for securing the stabilizer to the step platform,
- a bottom plate between the braces, the braces and bottom thus forming a chute with a front directed outward from under the motor home, adapted to slidably receive the step for storage,
- a support bar above the bottom plate also between the braces secured near the chute front,
- the step between the braces further comprising a step bottom plate between two step side plates extending upward and rearward from the step bottom plate, each step side plate forming a triangular end extending upward and rearward of the step bottom plate, the triangular end resting on the step bottom plate when the step is extended out of the chute, and each step side plate further having a slot approximately parallel with the step bottom plate running from a position intermediate the bottom plate rearward into the triangular end with the support bar passing through the step side plates from which the step hangs such that when the step is slid rearward in the chute the support bar is forward in the side plate slots with the step tipped upward and resting on the triangular end, and when the step is pulled out of the chute, the step bar is fully rearward in the slots supporting the step hanging from the bar with the triangular end resting on the bottom plate at the chute front.

3. A stabilizer assembly for mounting to a retractable hanging step platform mounted on one of motor homes and travel trailers under an entry door and disposed to hang from the motor home before said door as an auxiliary step for ease in entering the motor home, adapted to retract for storage under the motor home during travel, the assembly comprising

- one or more step stabilizers including a stanchion with ends for engaging a ground surface below the step,
- a horizontal mount secured to the step, the stabilizers secured to the horizontal mount,
- means for securing the stabilizers to the step platform with the stabilizers with stanchion disposed to extend from the horizontal mount to the ground surface, and
- means for retracting the stabilizer from a first position extended to the ground surface to a second position parallel to the horizontal mount for storage.

4. The step platform of claim 3 further comprising

- a stanchion extension,
- means for mounting the stanchion extension to a stanchion distal end, extending the extension therefrom adjustably in length.

* * * * *